(12) United States Patent
Wei et al.

(10) Patent No.: US 10,571,339 B2
(45) Date of Patent: *Feb. 25, 2020

(54) PLANE SOURCE BLACKBODY

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,577

(22) Filed: Nov. 21, 2018

(65) Prior Publication Data

US 2019/0212201 A1  Jul. 11, 2019

(30) Foreign Application Priority Data

Jan. 11, 2018  (CN) .......................... 2018 1 0026972

(51) Int. Cl.
 *G01J 5/52* (2006.01)
 *G01J 5/04* (2006.01)
 *G01J 5/02* (2006.01)
 *G01J 5/00* (2006.01)
(52) U.S. Cl.
 CPC .............. *G01J 5/522* (2013.01); *G01J 5/023* (2013.01); *G01J 5/046* (2013.01); *G01J 2005/0048* (2013.01)

(58) Field of Classification Search
 CPC .......................... G01J 5/522; G01J 2005/0048
 USPC .................... 250/496.1, 503.1, 504 R, 504 H
 See application file for complete search history.

(56) References Cited

U.S. PATENT DOCUMENTS

| 8,741,422 | B2 | 6/2014 | Miao | |
|---|---|---|---|---|
| 2008/0192797 | A1 | 8/2008 | Ko et al. | |
| 2009/0096348 | A1 | 4/2009 | Liu et al. | |
| 2011/0108545 | A1 | 5/2011 | Wang et al. | |
| 2011/0315882 | A1 | 12/2011 | Hu et al. | |
| 2012/0312773 | A1 | 12/2012 | Cheng et al. | |
| 2019/0212199 | A1* | 7/2019 | Wei ......................... | G01J 5/522 |
| 2019/0212200 | A1* | 7/2019 | Wei ......................... | G01J 5/522 |
| 2019/0212203 | A1* | 7/2019 | Wei ......................... | G01J 5/522 |
| 2019/0212204 | A1* | 7/2019 | Wei ......................... | G01J 5/522 |

FOREIGN PATENT DOCUMENTS

| CN | 101409961 | 4/2009 |
|---|---|---|
| CN | 103602132 | 2/2014 |
| CN | 107014494 | 8/2017 |

(Continued)

*Primary Examiner* — Nicole M Ippolito
*Assistant Examiner* — Hanway Chang
(74) *Attorney, Agent, or Firm* — ScienBiziP, P.C.

(57) ABSTRACT

A plane source blackbody is provided. The plane source blackbody comprises a panel and a carbon nanotube composite material. The panel comprising a first surface and a second surface, and the first surface is opposite to the second surface. The carbon nanotube composite material is located on the first surface. The carbon nanotube composite material comprises a black lacquer and a plurality of carbon nanotubes, and the plurality of carbon nanotubes is dispersed in the black lacquer.

13 Claims, 4 Drawing Sheets

(56) References Cited

FOREIGN PATENT DOCUMENTS

| | | |
|---|---|---|
| JP | 2015-203589 | 11/2015 |
| TW | 200834046 | 8/2008 |
| TW | 201125419 | 7/2011 |
| TW | 201250720 | 12/2012 |
| TW | I410615 | 10/2013 |
| WO | 2016/107883 | 7/2016 |

* cited by examiner

PLANE SOURCE BLACKBODY

CROSS-REFERENCE TO RELATED APPLICATIONS

This application claims all benefits accruing under 35 U.S.C. § 119 from China Patent Application No. 201810026972.6, filed on Jan. 11, 2018, in the China Intellectual Property Office, the contents of which are hereby incorporated by reference. The application is also related to copending applications entitled, "CAVITY BLACKBODY RADIATION SOURCE AND METHOD OF MAKING THE SAME", filed on Nov. 21, 2018 (application Ser. No. 16/198,549). The application is also related to copending applications entitled, "CAVITY BLACKBODY RADIATION SOURCE", filed on Nov. 21, 2018 (application Ser. No. 16/198,565). The application is also related to copending applications entitled, "CAVITY BLACKBODY RADIATION SOURCE AND METHOD OF MAKING THE SAME", filed on Nov. 21, 2018 (application Ser. No. 16/198,590). The application is also related to copending applications entitled, "CAVITY BLACKBODY RADIATION SOURCE AND METHOD OF MAKING THE SAME", filed on Nov. 21, 2018 (application Ser. No. 16/198,598). The application is also related to copending applications entitled, "PLANE SOURCE BLACKBODY", filed on Nov. 21, 2018 (application Ser. No. 16/198,606). The application is also related to copending applications entitled, "PLANE SOURCE BLACKBODY", filed on Jan. 10, 2019 (application Ser. No. 16/244,449). The application is also related to copending applications entitled, "BLACKBODY RADIATION SOURCE", filed on Jan. 10, 2019 (application Ser. No. 16/244,455). The application is also related to copending applications entitled, "BLACKBODY RADIATION SOURCE", filed on Jan. 10, 2019 (application Ser. No. 16/244,468). The application is also related to copending applications entitled, "BLACKBODY RADIATION SOURCE", filed on Jan. 10, 2019 (application Ser. No. 16/244,474). The application is also related to copending applications entitled, "BLACKBODY RADIATION SOURCE", filed on Jan. 10, 2019 (application Ser. No. 16/244,481). The application is also related to copending applications entitled, "PLANE SOURCE BLACKBODY", filed on Jan. 10, 2019 (application Ser. No. 16/244,488).

FIELD

The present disclosure relates to a blackbody radiation source, especially relates to a plane source blackbody.

BACKGROUND

With a rapid development of infrared remote sensing technology, the infrared remote sensing technology is widely used in military and civilian fields, such as earth exploration, weather forecasting, and environmental monitoring. However, all infrared detectors need to be calibrated by a blackbody before they can be used. The higher an emissivity of the blackbody, the higher an accuracy of a calibration of the infrared detector. Blackbody includes cavity blackbody and plane source blackbody. An effective emissivity of the plane source blackbody mainly depends on a surface structure and an a surface material emissivity of the plane source blackbody. Therefore, selecting high emissivity intracavity surface materials has a great significance for obtaining high performance plane source blackbody.

BRIEF DESCRIPTION OF THE DRAWINGS

Implementations of the present technology will now be described, by way of example only, with reference to the attached figures, wherein.

DETAILED DESCRIPTION

Figure 1:
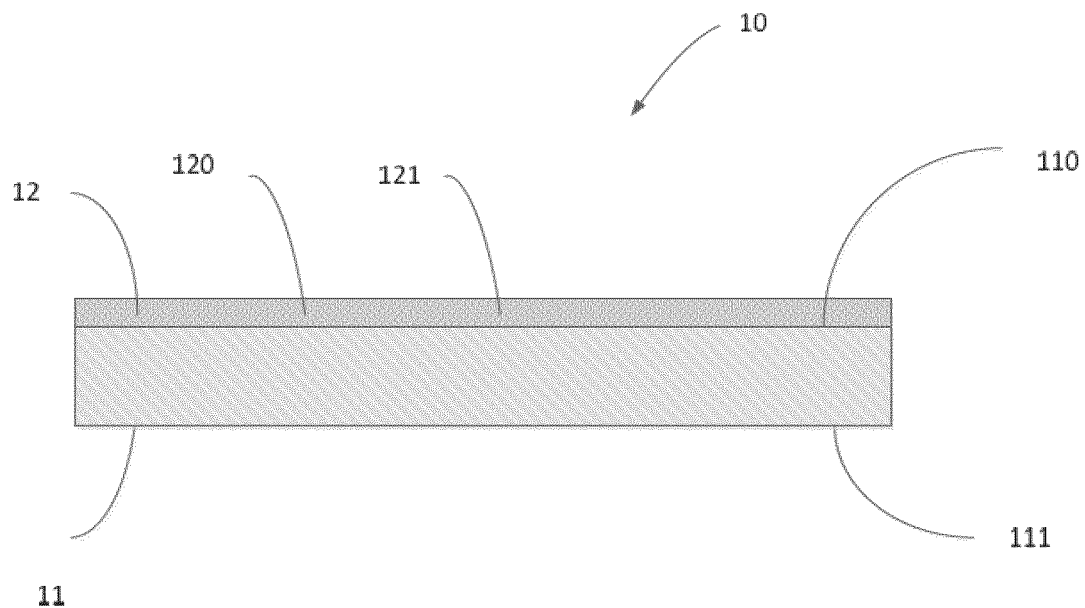
FIG. 1 is a section structure diagram of one embodiment of a plane source blackbody.

The disclosure is illustrated by way of example and not by way of limitation in the figures of the accompanying drawings in which like references indicate similar elements. It should be noted that references to "another," "a", or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

The disclosure is described in relation to a plane source blackbody. The plane source blackbody comprises a panel and a carbon nanotube composite material. The panel comprises a first surface and a second surface. The carbon nanotube composite material is located on the first surface. The carbon nanotube composite material comprises a black lacquer and a plurality of carbon nanotubes. The plurality of carbon nanotubes is dispersed in the black lacquer. The black lacquer has high emissivity, such as Pyromark 1200 black lacquer having an emissivity 0.92, Nextel Velvet 811-21 black lacquer having an emissivity 0.95. A mass ratio of the plurality of carbon nanotubes in the carbon nanotube composite material ranges from about 1% to about 50%. In one embodiment, the mass ratio of the plurality of carbon nanotubes in the carbon nanotube composite material ranges from about 2% to about 10%.

In one embodiment, the plurality of carbon nanotubes is in an upright state in the black lacquer, and the axial directions of the plurality of carbon nanotube are substantially perpendicular to the first surface. The plurality of carbon nanotubes remain in the upright state in the black lacquer, adjacent carbon nanotubes are nearly parallel and form a gap. When light rays are incident on the plane source blackbody, the light rays are reflected back and forth by the adjacent carbon nanotubes in the gap, and the light rays emitted from the plane source blackbody are greatly reduced, so an emissivity of the carbon nanotube composite material is further improved.

The panel is made of a material resistant to high temperature and having a high emissivity. The panel can be made of hard aluminum material, aluminum alloy material or oxygen-free copper.

The carbon nanotube composite material is a layered structure having a flat surface and a large surface roughness.

In one embodiment, the plane source blackbody further comprises a heating element. In one embodiment, the heating element comprises a carbon nanotube structure.

FIG. 1 shows one embodiment in relation to a plane source blackbody 10. The plane source blackbody 10 comprises a panel 11 and a carbon nanotube composite material 12. The panel 11 comprises a first surface 110 and a second surface 111 opposite to the first surface 110. The carbon nanotube composite material 12 is located on the first surface 110. The carbon nanotube composite material 12 comprises a black lacquer 120 and a plurality of carbon nanotubes 121. The plurality of carbon nanotubes 121 is dispersed and randomly arranged in the black lacquer 120. The black lacquer 120 is Pyromark 1200 black lacquer 120. A mass ratio of the plurality of carbon nanotubes 121 in the carbon nanotube composite material 12 is 2%.

A material of the panel 11 is an aluminum alloy. The panel 11 is a flat structure.

The carbon nanotube composite material 12 is a layered structure having a flat surface and a large surface roughness.

The plane source blackbody 10 comprises a heating element. The heating element is located on the second surface 111. The heating element comprises a carbon nanotube structure, a first electrode and a second electrode, the first electrode and the second electrode are located on a surface of the carbon nanotube structure and spaced apart from each other. The carbon nanotube structure is located on the second surface 111. The carbon nanotube structure comprises at least one carbon nanotube film or at least one carbon nanotube wire. The carbon nanotube structure comprises a plurality of carbon nanotubes joined end to end and arranged in a preferred orientation. The plurality of carbon nanotubes of the carbon nanotube structure extends from the first electrode to the second electrode.

Because the carbon nanotube structure is located on the second surface 111 of the panel 11, after the carbon nanotube structure is energized by the first electrode and the second electrode, the carbon nanotube structure can heat the whole plane source blackbody 10. So that a temperature field of the plane source blackbody 10 is evenly distributed, the temperature stability and uniformity of the plane source blackbody 10 10 can be improved. Since carbon nanotube has small density and light weight, using the carbon nanotube structure as the heating element allows the plane source blackbody 10 10 to have a lighter weight. Since carbon nanotubes have high electrothermal conversion efficiency and low thermal resistance, and the carbon nanotube structure has small resistance; using the carbon nanotube structure to heat the plane source blackbody 10 has the characteristics of rapid temperature rise, small thermal hysteresis and fast heat exchange rate. Carbon nanotubes have good toughness, and thus the plane source blackbody 10 using the carbon nanotube structure as heating element has a long service life.

One embodiment is described in relation to a method of making the plane source blackbody 10. The method comprises:

block (B11), providing a panel and a carbon nanotube slurry, the panel comprises a first surface and a second surface, and the carbon nanotube slurry comprises a black lacquer and a plurality of carbon nanotubes;

block (B12), coating the carbon nanotube slurry on the first surface, and drying the carbon nanotube slurry to form a carbon nanotube composite material.

In block (B11), the panel is a flat structure. A material of the panel is an aluminum alloy. The first surface is opposite to the second surface.

The carbon nanotube slurry comprises a black lacquer and a plurality of carbon nanotubes. The plurality of carbon nanotubes is dispersed and randomly arranged in the black lacquer. The black lacquer is Pyromark 1200 black lacquer. A mass ratio of the plurality of carbon nanotubes in the carbon nanotube composite material is 2%.

In block (B12), in the carbon nanotube composite material, the plurality of carbon nanotubes are uniformly dispersed in the black lacquer.

In one embodiment, the method further comprises putting the heating element on the second surface, and the plane source blackbody 10 can be heated in real time.

Figure 2:
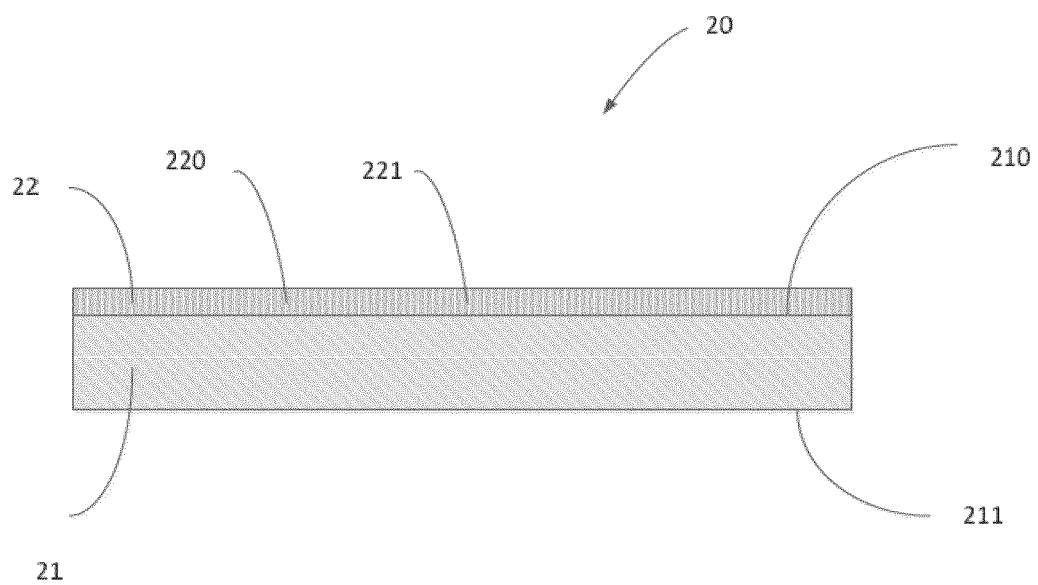
FIG. 2 is a section structure diagram of one embodiment of a plane source blackbody.

FIG. 2 shows one embodiment in relation to a plane source blackbody 20. A structure of the plane source blackbody 20 is substantially the same as that of the plane source blackbody 10. The plane source blackbody 20 comprises a blackbody radiation cavity 201. The blackbody radiation cavity 201 comprises a panel 21 and a carbon nanotube composite material 22. The panel 21 comprises a first surface 210 and a second surface 211 opposite to the first surface 210. The carbon nanotube composite material 22 is located on the first surface 210. The carbon nanotube composite material 22 comprises a Pyromark 1200 black lacquer 220 and a plurality of carbon nanotubes 221. A mass ratio of the plurality of carbon nanotubes 221 in the carbon nanotube composite material is about 3%. The plurality of carbon nanotubes 221 remain in an upright state in the black lacquer 220, and the axial directions of the plurality of carbon nanotube 221 are substantially perpendicular to the first surface of the plane source blackbody 10.

The plurality of carbon nanotubes 221 remains in the upright state in the black lacquer 220, adjacent carbon nanotubes 221 are nearly parallel and form a gap. When light rays are incident on the plane source blackbody 10, the light rays are reflected back and forth by the adjacent carbon nanotubes 221 in the gap, and the light rays emitted from the plane source blackbody 10 are greatly reduced, so an emissivity of the carbon nanotube composite material 22 is further improved.

In one embodiment, the plurality of carbon nanotubes 221 remains in the upright state in the black lacquer 220 by a first method. The first method comprises bonding an adhesive tape to a surface of the carbon nanotube composite material 22; heating the adhesive tape at a certain temperature to make the plurality of carbon nanotubes 221 are stuck by the tape; removing the tape at the certain temperature to pull up the plurality of carbon nanotubes 221, and make the plurality of carbon nanotubes 221 erect and substantially perpendicular to the first surface of the plane source blackbody 10.

In one embodiment, the plurality of carbon nanotubes 221 remains in the upright state in the black lacquer 220 by a second method. The second method comprises pouring liquid glue onto a surface of the carbon nanotube composite material 22 and flowing flat the liquid glue on the surface of the CNT composite; curing the liquid glue, and a method of curing depends on a nature of the liquid glue; and removing the cured liquid glue on the surface of the carbon nanotube composite material 22 to make the plurality of carbon nanotubes 221 erect and substantially perpendicular to the first surface of the plane source blackbody 10. The cured liquid glue can be removed by tweezers or other tools.

Figure 3:
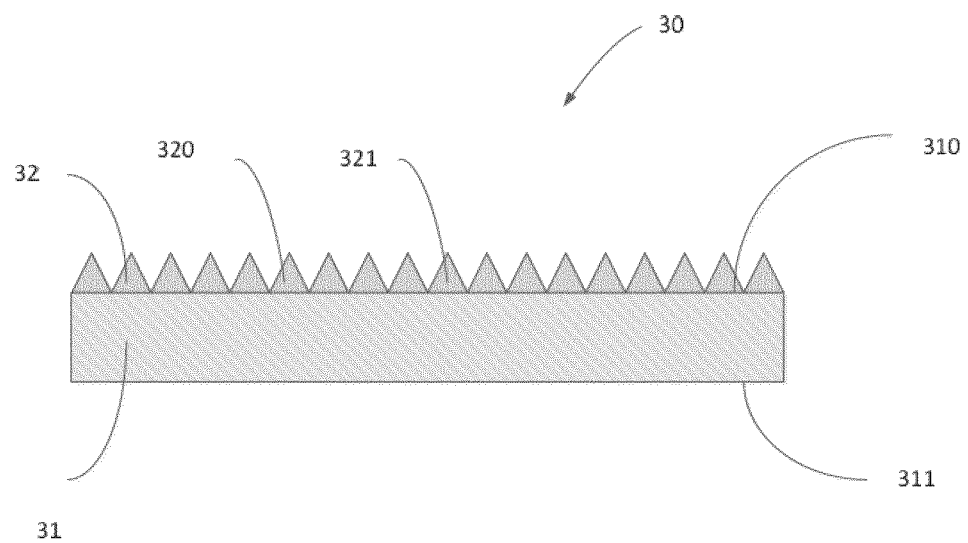
FIG. 3 is a section structure diagram of one embodiment of a plane source blackbody.

FIG. 3 shows one embodiment in relation to a plane source blackbody 30. The plane source blackbody 30 comprises a panel 31 and a carbon nanotube composite material 32. The panel 31 comprises a first surface 310 and a second surface 311. The carbon nanotube composite material 32 is located on the first surface 310. The carbon nanotube composite material 32 comprises a black lacquer 320 and a plurality of carbon nanotubes 321. The plurality of carbon nanotubes 321 is dispersed and randomly arranged in the black lacquer 320. A surface of the carbon nanotube composite material 32 comprises a plurality of microstructures. The plurality of microstructures can be a strip protrusion or a dot protrusion. A cross-sectional shape of the strip protrusion comprises triangular, trapezoidal, square, and the like. A cross-sectional shape of the dot protrusion comprises triangular, trapezoidal, square, and the like. In one embodiment, the plurality of microstructures is a plurality of dot protrusions, and each of the plurality of dot protrusions is a triangular pyramid. The black lacquer 304 is Nextel Velvet 811-21 black lacquer, and an emissivity of the Nextel Velvet 811-21 black lacquer is about 0.95. A mass ratio of the plurality of carbon nanotubes 321 in the carbon nanotube composite material 32 is 5%.

A material of the panel 31 is an aluminum alloy. The panel 31 is a flat structure.

In one embodiment, the plane source blackbody 30 further comprises a heating element. The heating element comprises a carbon nanotube structure.

The surface of the carbon nanotube composite material 32 comprises a plurality of microstructures, and thus the surface area of the panel 31 is increased, and further the emissivity of the plane source blackbody 30 is increased.

One embodiment is described in relation to a first method of making the plane source blackbody 30. The first method comprises:

block (B21), providing a panel and a carbon nanotube slurry, the panel comprises a first surface and a second surface, and the carbon nanotube slurry comprises a black lacquer and a plurality of carbon nanotubes;

block (B22), coating the carbon nanotube slurry on the first surface, and drying the carbon nanotube slurry to form a carbon nanotube composite material; and block (B23), forming a plurality of microstructures on the surface of the carbon nanotube composite material.

In block (B21), the panel is a flat structure. A material of the panel is an aluminum alloy. The first surface is opposite to the second surface.

The carbon nanotube slurry comprises a black lacquer and a plurality of carbon nanotubes. The plurality of carbon nanotubes is dispersed in the black lacquer. The black lacquer is Nextel Velvet 811-21 black lacquer, and an emissivity of the Nextel Velvet 811-21 black lacquer is about 0.95. A mass ratio of the plurality of carbon nanotubes in the carbon nanotube slurry is 5%.

In block (B22), coating the carbon nanotube slurry on the first surface, and drying the carbon nanotube slurry to form the carbon nanotube composite material. In the carbon nanotube composite material, the plurality of carbon nanotubes is uniformly dispersed in the black lacquer.

In block (B23), the step of forming the plurality microstructures on the surface of the carbon nanotube composite material is performed by a laser irradiation. The laser beam spot diameter, power, and scanning speed are determined by the shape and size of the plurality of microstructures. In one embodiment, providing a laser, an irradiation path of a laser beam from the laser can be controlled by a computer program; and irradiating the surface of the carbon nanotube composite material by the laser, to form a plurality of triangular pyramids on the surface of the carbon nanotube composite material.

The first method can further comprises putting the heating element on the second surface of the plane source blackbody 30. The plane source blackbody 30 can be heated in real time.

One embodiment is described in relation to a second method of making the plane source blackbody 30 30. The second method comprises:

block (B31), providing a panel 31 and a carbon nanotube slurry, the panel 31 comprises a first surface and a second surface opposite to the first surface, and the first surface comprises a plurality of microstructures; and the carbon nanotube slurry comprises a black lacquer and a plurality of carbon nanotubes; and block (B32), coating the carbon nanotube slurry on the first surface, and drying the carbon nanotube slurry to form a carbon nanotube composite material;

The block (B31) is substantially same as the block (B21) except that the first surface comprises a plurality of microstructures, the plurality of microstructures is a plurality of triangular pyramid, and a non-flat concave tapered groove is formed at a bottom end connection between adjacent triangular pyramids.

In block (B32), a surface of each of the plurality of triangular pyramids is coated with the carbon nanotube slurry, but the carbon nanotube slurry does not completely cover the plurality of triangular pyramids, and a shape of each of the plurality of triangular pyramids remains. Drying the carbon nanotube slurry to form a layer of carbon nanotube composite material on the surface of each of the plurality of triangular pyramid. That is, a plurality of triangular pyramids is formed on a surface of the carbon nanotube composite material.

The plurality of microstructures can be a strip protrusion or a dot protrusion. A cross-sectional shape of the strip protrusion can be triangular, trapezoidal, square, or the like. A cross-sectional shape of the dot protrusion can be triangular, trapezoidal, square, or the like.

Figure 4:
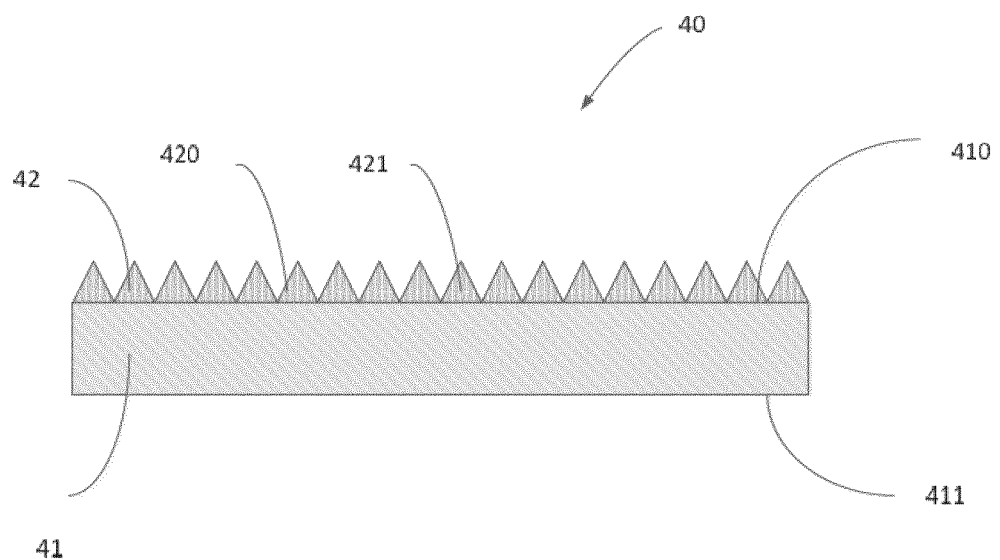
FIG. 4 is a section structure diagram of one embodiment of a plane source blackbody.

FIG. 4 shows one embodiment in relation to a plane source blackbody 40. The plane source blackbody 40 comprises a panel 41 and a carbon nanotube composite material 42. The panel 41 comprises a first surface 410 and a second surface 411 opposite to the first surface 410. The carbon nanotube composite material 42 comprises black lacquer 420 and a plurality of carbon nanotubes 421. A surface of the carbon nanotube composite material 42 comprises a plurality of microstructures. The plurality of microstructures is a dot protrusion. The dot protrusion is a triangular pyramid. A mass ratio of the plurality of carbon nanotubes 421 in the carbon nanotube composite material 42 is 4%. The black lacquer 420 is Nextel Velvet 811-21 black lacquer, and an emissivity of the Nextel Velvet 811-21 black lacquer is about 0.95. The plurality of carbon nanotubes 421 remain in an upright state in the Nextel Velvet 811-21 black lacquer, and the axial directions of the plurality of carbon nanotube 421 are substantially perpendicular to the first surface of the panel 41.

A method of making the plurality of carbon nanotubes 421 remain in the upright state in the black lacquer 420 is the same with the method of making the plurality of carbon nanotubes 221 remain in the upright state in the black lacquer 220.

The surface of the carbon nanotube composite material 42 comprises a plurality of microstructures, and thus the surface area of the panel 41 is increased, and further the emissivity of the plane source blackbody 40 is increased.

The plane source blackbody of this disclosure has many advantages. First, carbon nanotubes are currently the darkest material in the world, the emissivity of carbon nanotubes is 99.6%, which is far larger than that of currently surface material of the plane source blackbody. For example, an emissivity of the Nextel Velvet 81-21 black lacquer is only 96%. Therefore, the emissivity of the carbon nanotube composites comprising the carbon nanotubes and black lacquer is also larger than that of the surface material of currently plane source blackbody.

Second, when the plurality of carbon nanotubes remain in the upright state in the black lacquer, adjacent carbon nanotubes are nearly parallel and form a gap. When light rays are incident on the plane source blackbody, the light rays are reflected back and forth by the adjacent carbon nanotubes in the gap, and the light rays emitted from the plane source blackbody are greatly reduced, so an emissivity of the carbon nanotube composite material is further improved.

Third, the carbon nanotubes can be prepared by a chemical vapor deposition of carbon source gas under high temperature conditions, and the raw materials are cheap and easy to obtain.

Fourth, the carbon nanotubes have excellent mechanical properties. The use of carbon nanotube materials to prepare plane source blackbody can increase the stability of the plane source blackbody, and make the star borne blackbody not easy to damage in harsh environments.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A plane source blackbody comprising:
    a panel comprising a first surface and a second surface opposite with the first surface; and
    a carbon nanotube composite material located on the first surface, wherein the carbon nanotube composite material comprises a black lacquer and a plurality of carbon nanotubes, and the plurality of carbon nanotubes is dispersed in the black lacquer.

2. The plane source blackbody of claim 1, wherein a surface of the carbon nanotube composite material comprises a plurality of microstructures.

3. The plane source blackbody of claim 2, wherein a shape of each of the plurality of microstructures is a strip protrusion or a dot protrusion.

4. The plane source blackbody of claim 3, wherein a cross-sectional shape of the strip protrusion is triangular, trapezoidal, or square.

5. The plane source blackbody of claim 3, wherein a cross-sectional shape of the dot protrusion is triangular, trapezoidal, or square.

6. The plane source blackbody of claim 1, wherein a mass ratio of the plurality of carbon nanotubes in the carbon nanotube composite material ranges from about 1% to about 50%.

7. The plane source blackbody of claim 6, wherein the mass ratio of the plurality of carbon nanotubes in the carbon nanotube composite material ranges from about 2% to about 10%.

8. The plane source blackbody of claim 1, wherein the black lacquer is Pyromark 1200 black lacquer or Nextel Velvet 811-21 black lacquer.

9. The plane source blackbody of claim 1, wherein an axial direction of each of the plurality of carbon nanotube is substantially perpendicular to the first surface.

10. The plane source blackbody of claim 1, further comprising a heating element located on the second surface.

11. The plane source blackbody of claim 10, wherein the heating element comprises a carbon nanotube structure, a first electrode and a second electrode, the first electrode and the second electrode are located on a surface of the carbon nanotube structure and spaced apart from each other.

12. The plane source blackbody of claim 1, wherein a material of the panel is hard aluminum material, aluminum alloy material, or oxygen-free copper.

13. The plane source blackbody of claim 1, wherein the carbon nanotube composite material is a layered structure having a flat surface.

* * * * *